United States Patent
Gangadharan (10) Patent No.: US 7,469,295 B1
(45) Date of Patent: Dec. 23, 2008

(54) MODIFIED ROUND ROBIN LOAD BALANCING TECHNIQUE BASED ON IP IDENTIFIER

(75) Inventor: SushilKumar Gangadharan, Santa Clara, CA (US)

(73) Assignee: Network Appliance, Inc., Sunnyvale, CA (US)

(*) Notice: Subject to any disclaimer, the term of this patent is extended or adjusted under 35 U.S.C. 154(b) by 523 days.

(21) Appl. No.: 09/888,677

(22) Filed: Jun. 25, 2001

(51) Int. Cl.
*G06F 15/16* (2006.01)

(52) U.S. Cl. .................. 709/232; 370/395.21; 370/229; 370/395.41

(58) Field of Classification Search .................. 709/232, 709/250, 228, 238, 224, 245, 237; 370/229, 370/402, 310, 392, 230, 395, 469, 472, 401, 370/395.32, 230.1, 238; 718/105; 713/201
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,841,764 A * | 11/1998 | Roderique et al. | 370/310 |
| 5,931,918 A | 8/1999 | Row et al. | |
| 5,941,972 A | 8/1999 | Hoese et al. | |
| 5,963,962 A | 10/1999 | Hitz et al. | |
| 5,987,493 A * | 11/1999 | Rangan et al. | 718/105 |
| 6,038,570 A | 3/2000 | Hitz et al. | |
| 6,065,037 A | 5/2000 | Hitz et al. | |
| 6,151,326 A * | 11/2000 | McGuire et al. | 370/402 |
| 6,157,649 A * | 12/2000 | Peirce et al. | 370/401 |
| 6,157,955 A * | 12/2000 | Narad et al. | 709/228 |
| 6,178,448 B1 * | 1/2001 | Gray et al. | 709/224 |
| 6,185,208 B1 * | 2/2001 | Liao | 370/392 |
| 6,253,247 B1 * | 6/2001 | Bhaskar et al. | 709/237 |
| 6,415,329 B1 * | 7/2002 | Gelman et al. | 709/245 |
| 6,425,035 B2 | 7/2002 | Hoese et al. | |
| 6,515,963 B1 * | 2/2003 | Bechtolsheim et al. | 370/229 |
| 6,563,829 B1 * | 5/2003 | Lyles et al. | 370/395.21 |
| 6,587,431 B1 * | 7/2003 | Almulhem et al. | 370/229 |
| 6,591,303 B1 * | 7/2003 | Hendel et al. | 709/238 |
| 6,603,765 B1 * | 8/2003 | Wilford et al. | 370/395.32 |
| 6,742,045 B1 * | 5/2004 | Albert et al. | 709/238 |
| 6,778,495 B1 * | 8/2004 | Blair | 370/230 |

(Continued)

OTHER PUBLICATIONS

Jerkins, Judith L., "A Measurement Analysis of Internet Traffic over Frame Relay", ACM Sigmetrics Performance Evaluation Review, vol. 27, Issue 2, pp. 3-14.*

(Continued)

*Primary Examiner*—Dustin Nguyen
(74) *Attorney, Agent, or Firm*—Cesari and McKenna LLP (57) ABSTRACT

A load balancing technique uniformly distributes data transmitted by a server over a plurality of underlying physical links of a virtual interface or aggregate within a computer network. According to the invention, the unit of data granularity is preferably a datagram, rather than an Internet protocol (IP) fragment or packet. The load balancing technique implements a round robin scheduling policy among the links based on an identifier (ID) associated with each datagram. As a result, the technique ensures that all fragments of a datagram are forwarded over the same physical link of the aggregate on the basis of a similar IP ID.

13 Claims, 6 Drawing Sheets

U.S. PATENT DOCUMENTS

| | | | |
|---|---|---|---|
| 6,791,982 B2 * | 9/2004 | Westberg | 370/392 |
| 6,795,866 B1 * | 9/2004 | Mankude et al. | 709/238 |
| 6,798,788 B1 * | 9/2004 | Viswanath et al. | 370/469 |
| 6,934,250 B1 * | 8/2005 | Kejriwal et al. | 370/229 |
| 7,027,394 B2 * | 4/2006 | Gupta et al. | 370/230.1 |
| 7,136,395 B2 * | 11/2006 | Lupien et al. | 370/472 |
| 7,233,575 B1 * | 6/2007 | Jarvis | 370/238 |
| 2001/0027496 A1 * | 10/2001 | Boucher et al. | 709/250 |
| 2001/0036154 A1 * | 11/2001 | Takagi | 370/229 |
| 2002/0010866 A1 * | 1/2002 | McCullough et al. | 713/201 |
| 2002/0087716 A1 * | 7/2002 | Mustafa | 709/236 |

OTHER PUBLICATIONS

U.S. Appl. No. 09/888,778, filed Jun. 25, 2001, S. Gangadharan.

IEEEE Standard for Carrier Sense Multiple Access with Collision Detection (CSMA/CD) Access Method and Physical Layer of Specifications; Aggregation of Multiple Link Segments. Amendment to IEEE Std 802.3, 1998 Edition, month unknown.

* cited by examiner

MODIFIED ROUND ROBIN LOAD BALANCING TECHNIQUE BASED ON IP IDENTIFIER

FIELD OF THE INVENTION

The present invention relates to aggregation of physical links in a computer network and, more specifically, to a load balancing policy configured to uniformly distribute data over the aggregated physical links.

BACKGROUND OF THE INVENTION

Data communication in a computer network involves the exchange of data traffic between two or more entities interconnected by communication links. These entities are typically software programs executing on hardware computer platforms which, depending on their roles within the network, may serve as end nodes or intermediate network nodes. Examples of end nodes may include client and server computers coupled to the communication links, whereas the intermediate nodes may include routers and network switches that interconnect those links. A server is a special-purpose computer configured to provide specific services; when operating according to a client/server model of information delivery, the server may be configured to allow many clients to access its services. Each client may request those services by issuing protocol messages (in the form of packets) to the server over the communication links, such as a point-to-point or shared local area network (LAN) medium. The server then responds to the client request by returning the requested services in the form of packets transported over the network medium.

The server may include a plurality of ports or physical interfaces coupled to the communication links, wherein each interface is assigned at least one Internet protocol (IP) address and one media access control (MAC) address. A virtual interface or aggregate comprises an aggregation of the physical interfaces and their links. When logically combined as an aggregate, each physical interface responds to at least one IP address and to at least one common MAC address. Aggregation of physical links into a single virtual interface is well known and described in IEEE Standard 802.3ad, which is hereby incorporated by reference as though fully set forth herein.

All network entities, such as clients and switches, view the aggregate as a single network interface that provides a high data transfer rate to and from the server. In other words, the entities view the aggregate as a linear multiple of all the underlying physical interfaces and links. The physical interfaces of an aggregate advertise their common MAC address using, e.g., an address resolution protocol (ARP) to update a MAC table on a switch coupled to the server. The switch uses the table to determine the MAC address to which each physical interface on the server responds. When forwarding client data to traffic directed to the server, the switch may utilize any of the aggregated physical links to transport that data traffic. However, to provide the high data transfer rate, the data traffic "load" should be balanced across all the underlying physical links.

Conventional load balancing algorithms are used to uniformly distribute data traffic over all of the underlying physical links of an aggregate, thereby increasing the bandwidth efficiency of those links. Since the server generally responds to requests issued by a client, the switch may determine the type of load balancing policy applied to the aggregate. That is, the server may deliver its response over the same link that was used to receive the request. An example of a load balancing policy is an algorithm based on the MAC addresses of the clients serviced by the server. The switch employs this load-balancing algorithm to map a client MAC address to a physical link of the aggregate. This same type of algorithm may be applied to another conventional load balancing policy based on the IP addresses of the clients and the server (aggregate). Here, the switch logically combines the source IP address of each client with the destination IP address of the aggregate to map that client IP address to a physical interface link of the aggregate.

Each of these conventional algorithms assumes a uniform distribution of clients throughout the network such that the mapping of client addresses to underlying physical links of the aggregate result in a substantially even distribution of traffic across all of the underlying links. However, if the clients are not uniformly distributed throughout the network, it is possible that the data traffic may be unevenly distributed over the links. For example, if a substantial amount of data traffic is forwarded by the switch over only one or two of the underlying links, the remaining links become substantially unused, thereby adversely impacting the bandwidth utilization of the aggregate. The present invention is directed, in part, to solving this problem.

Another example of a conventional load balancing policy is an algorithm based on "pure" round robin scheduling of data packets among the aggregated links. Round robin scheduling is a desirable load balancing policy for an aggregate because, in its simplest implementation, the policy specifies dividing the number of packets evenly across all the underlying links of the aggregate. That is, a first packet is sent on a first underlying link, a second packet is sent on a second underlying link and so forth, wherein the data packets are continuously cycled among all of the links. However, implementation of the round robin policy may result in retransmissions of data packets due to, e.g., glitches associated with the underlying network links or "out-of-order" delivery of packets over those links. Network glitches may arise due to hardware problems, such as failed links or shortage of memory resources on a receiver.

In general, the type of data traffic served by the server may comprise user datagram protocol (UDP) or transport control protocol (TCP) traffic. The UDP and TCP protocols are well known and described in *Network Protocols, Signature Edition*, by Matthew G. Naugle, McGraw-Hill, 1999, at pgs. 519-541. In the case of a file system protocol, such as the conventional network file system (NFS) protocol, the size of a typical UDP datagram is 32K bytes (B). For an Ethernet medium coupling a NFS client to the server, the maximum transfer unit (MTU) size of each packet transferred over the medium is 1.5 KB. Therefore, an IP layer of the server apportions each datagram passed by a UDP protocol layer into approximately 23 fragments, wherein each fragment is transmitted over the medium as a single packet. Each fragment of a UDP datagram has a similar IP identifier (ID), but has a different fragment offset number.

When employing pure round robin scheduling to balance the UDP datagram load over the aggregate, the fragments/packets constituting the datagram are distributed evenly over the underlying physical links. However, a glitch associated with one of the links may result in loss ("dropping") of some of the fragments. For example, assume the server executes a round robin policy to uniformly distribute 23 fragments associated with a first UDP datagram over the underlying links of the aggregate followed by 23 fragments associated with a second UDP datagram. Assume further that because of a glitch with one of the links, some fragments of the first datagram are dropped. In accordance with the NFS protocol, the entire 23 fragments of the first UDP datagram must be retransmitted to the NFS client. If fragments of both the first and second datagrams are dropped because of the glitch, then the entire 46 fragments of both datagrams must be retransmitted. This results in substantial consumption and inefficient usage of network bandwidth. The present invention is further directed to solving this problem.

In contrast, the size of a typical TCP datagram is equal to the MTU size of the physical network medium or, e.g., 1.5 KB when transported over an Ethernet medium. Each typical TCP datagram is transmitted over the network medium as a single fragment/packet having a unique IP ID. Load balancing of TCP fragments/packets over the aggregate results in an even distribution of data packets over the underlying physical links. Yet, in the presence of heavy network traffic, the packets may arrive "out of order" at, e.g., an IP reassembly queue on the client. Specifically, a first packet transported over a first link of the aggregate may not arrive at the client before the second packet trans-ported over a second link of the aggregate if, for example, the first link is "down" or has more pending traffic then the second link. Also, if a switch is interposed between the client and server, then the order of the packets delivered by the server is not guaranteed through the switch and onto the client because of, e.g., differing lengths of the links and pending traffic at the switch. This results in inefficient consumption of memory resources and processing delay of the packets, along with possible retransmissions of the packets and inefficient use of network bandwidth. Accordingly, the present invention is directed to increasing the efficiency of network bandwidth over the underlying links of an aggregate.

SUMMARY OF THE INVENTION

The present invention comprises a load balancing technique configured to uniformly distribute data transmitted by a server over a plurality of underlying physical links of a virtual interface or aggregate within a computer network. As defined herein, a unit of data is preferably a datagram, rather than an Internet protocol (IP) fragment or packet. The novel load balancing technique implements a round robin scheduling policy among the links based on an identifier (ID) associated with each datagram. As a result, the technique ensures that all fragments of a datagram are forwarded over the same physical link of the aggregate on the basis of a similar IP ID.

In an aspect of the present invention, the technique implements a modified round robin algorithm that associates fragments/packets to a particular physical link of the aggregate for transmission from the server on the basis of the IP ID of every fragment and the number of active links in the aggregate. The IP ID is preferably a 16-bit value that is logically combined with a predetermined mask to establish a threshold at which groups of data are forwarded to each physical link of the aggregate. The IP ID of each datagram is preferably calculated in a sequential manner; accordingly, the effect of the algorithm is to rotate the fragments/packets over all the underlying links. In essence, the novel round robin, load balancing technique ensures that all fragments/packets having the same IP ID are sent to the same physical link of the aggregate.

In the illustrative embodiment, the novel load balancing technique operates independent of the transport mechanism, e.g., a User Datagram Protocol (UDP) transport or a Transport Control Protocol (TCP) transport, employed by the IP protocol. In the case of the UDP transport protocol, the novel technique reduces the number of possible retransmissions that may arise as a result of "dropping" of fragments due to, e.g., glitches associated with the computer network. For example, more than 20 fragments may be dropped before a retransmission of more than one datagram is necessary when implementing the inventive technique. In the case of the TCP transport protocol, the technique reduces the possibility of out-of-order delivery of packets to a client. Moreover, the inventive technique minimizes reordering of IP fragments belonging to the same UDP/TCP datagram.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
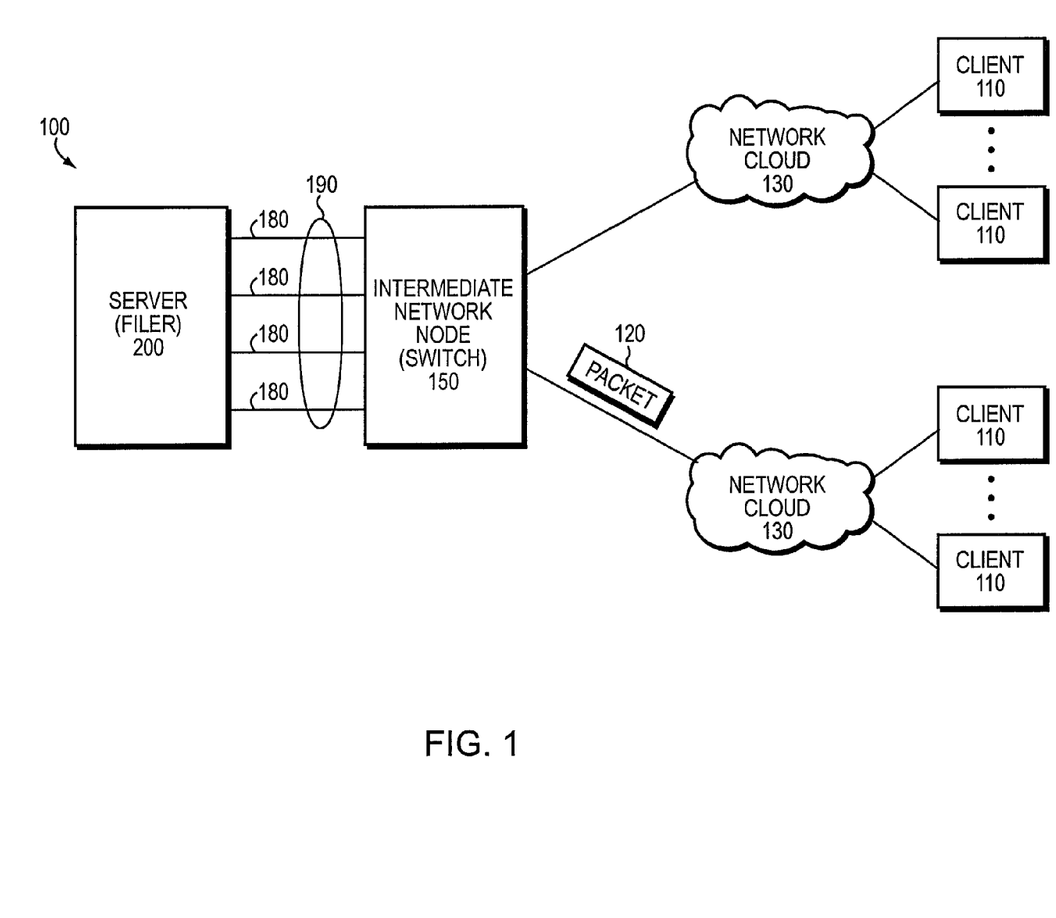
FIG. 1 is a schematic block diagram of a computer network including a plurality of clients and a server that may be advantageously used with the present invention.

FIG. 1 is a schematic block diagram of a computer network 100 including a plurality of clients 110 and a server 200 that may be advantageously used with the present invention. The server is a special-purpose computer preferably configured as a network storage appliance or filer 200 that provides file service relating to the organization of information on storage devices, such as disks. The client 110 may be a general-purpose computer configured to execute applications including file system protocols, such as the conventional network file system (NFS) protocol. Moreover, the client 110 may interact with the filer 200 in accordance with a client/server model of information delivery. That is, the client may request the services of the filer, and the filer may return the results of the services requested by the client, by exchanging packets 120 encapsulating, e.g., the NFS protocol format over the network 100. It will be understood to those skilled in the art that the inventive technique described herein may apply to any server capable of providing a service to any client in accordance with various applications executing on the client.

The filer 200 is coupled to an intermediate network node, such as a router or switch 150, over a plurality of physical links 180, each of which may comprise, e.g., a gigabit Ethernet link, a 100 base T Ethernet link, a 10 base T Ethernet link or any similar link. The switch 150 is further coupled to the clients 110 over network clouds 130 configured as virtual local area networks (VLANs). Alternatively, the filer may be connected directly to at least one client or to a plurality of intermediate network nodes 150, each of which is coupled to the clients over network clouds 130 configured as local area networks (LANs).

Figure 2:
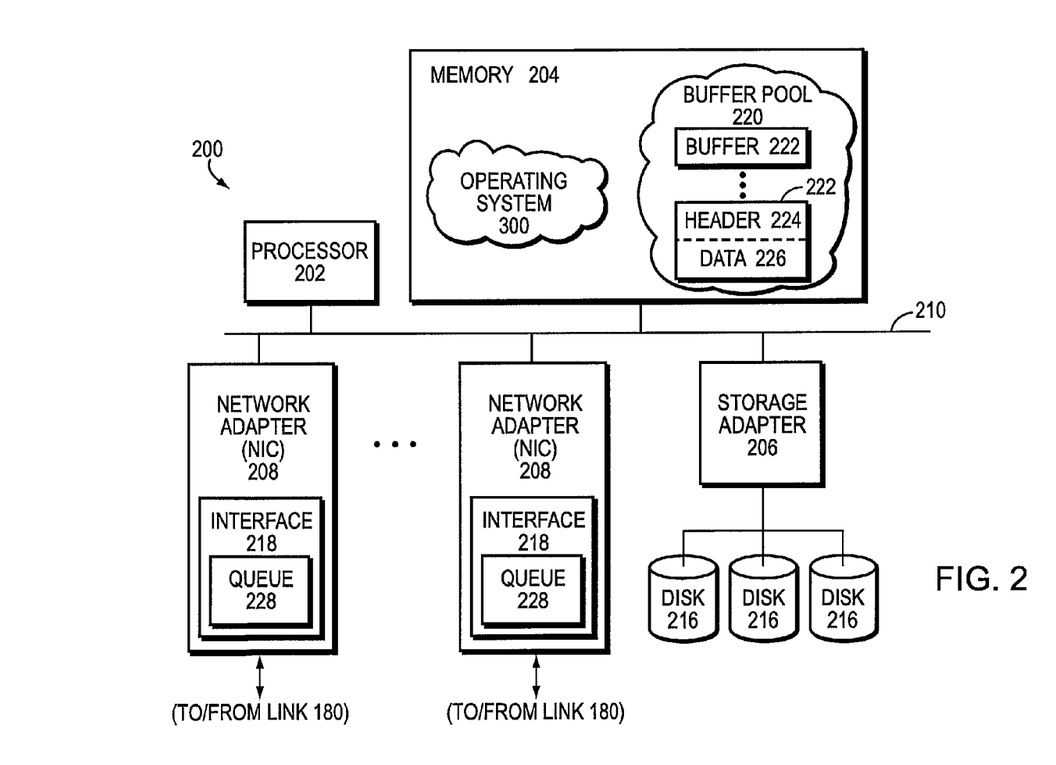
FIG. 2 is a schematic block diagram of a server, such as a network storage appliance or filer that may be advantageously used with the present invention.

FIG. 2 is a schematic block diagram of the filer 200 comprising a processor 202, a memory 204, a storage adapter 206 and at least one network adapter 208 interconnected by a system bus 210, which is preferably a conventional peripheral computer interconnect (PCI) bus 210. The filer also includes an operating system 300 that implements a file system to logically organize the information as a hierarchical structure of directories and files on disks 216 coupled to the storage adapter 206. In the illustrative embodiment described herein, the operating system 300 is preferably the NetApp® Data ONTAP™ operating system available from Network Appliance, Inc. that implements a Write Anywhere File Layout (WAFL) file system.

The memory 204 may be apportioned into various sections, one of which is a buffer pool 220 organized as a plurality of data buffers 222 for use by network drivers of the operating system 300. Each network driver is assigned a list of buffers 222 that are used to load incoming data requests received at interfaces 218 of the network adapter 208, as described herein. Other sections of the memory may be organized as storage locations that are addressable by the processor and adapters for storing software program code and data structures associated with the present invention. The processor and adapters may, in turn, comprise processing elements and/or logic circuitry configured to execute the software code and manipulate the data structures. The operating system 300, portions of which are typically resident in memory and executed by the processing elements, functionally organizes the filer by, inter alia, invoking storage and network operations in support of the services implemented by the filer 200. It will be apparent to those skilled in the art that other processing and memory means, including various computer readable media, may be used for storing and executing program instructions pertaining to the inventive technique described herein.

The storage adapter 206 cooperates with the operating system 300 executing on the filer to access information requested by the client, which information may be stored on the disks 216. The storage adapter includes input/output (I/O) interface circuitry that couples to the disks over an I/O interconnect arrangement, such as a conventional high-performance, Fibre Channel serial link topology. The information is retrieved by the storage adapter and, if necessary, processed by the processor 202 (or the adapter 206 itself) prior to being forwarded over the system bus 210 to the network adapter 208, where the information is formatted into a packet 120 and returned to the client 110.

The network adapter 208 may comprise a network interface card (NIC) having the mechanical, electrical and signaling circuitry needed to connect the filer 200 to the switch 150 over the physical links 180, which are preferably organized as a virtual interface or aggregate 190. Each NIC may include a single interface 218 such that, for a 4-link aggregate, the filer includes four NICs 208. Alternatively, each NIC 208 may include 4 "quad port" interfaces 218, each of which is connected to a link 180 of the aggregate 190. Each interface 218 may be assigned one or more Internet Protocol (IP) addresses along with one media access control (MAC) address. However, when the physical interfaces 218 and their associated links 180 are aggregated as a single virtual interface 190, all of the physical interfaces respond to only one MAC address. That is, the physical interfaces 218 are organized into one virtual "pipe" having one logical interface that is assigned a common MAC address.

Figure 3:
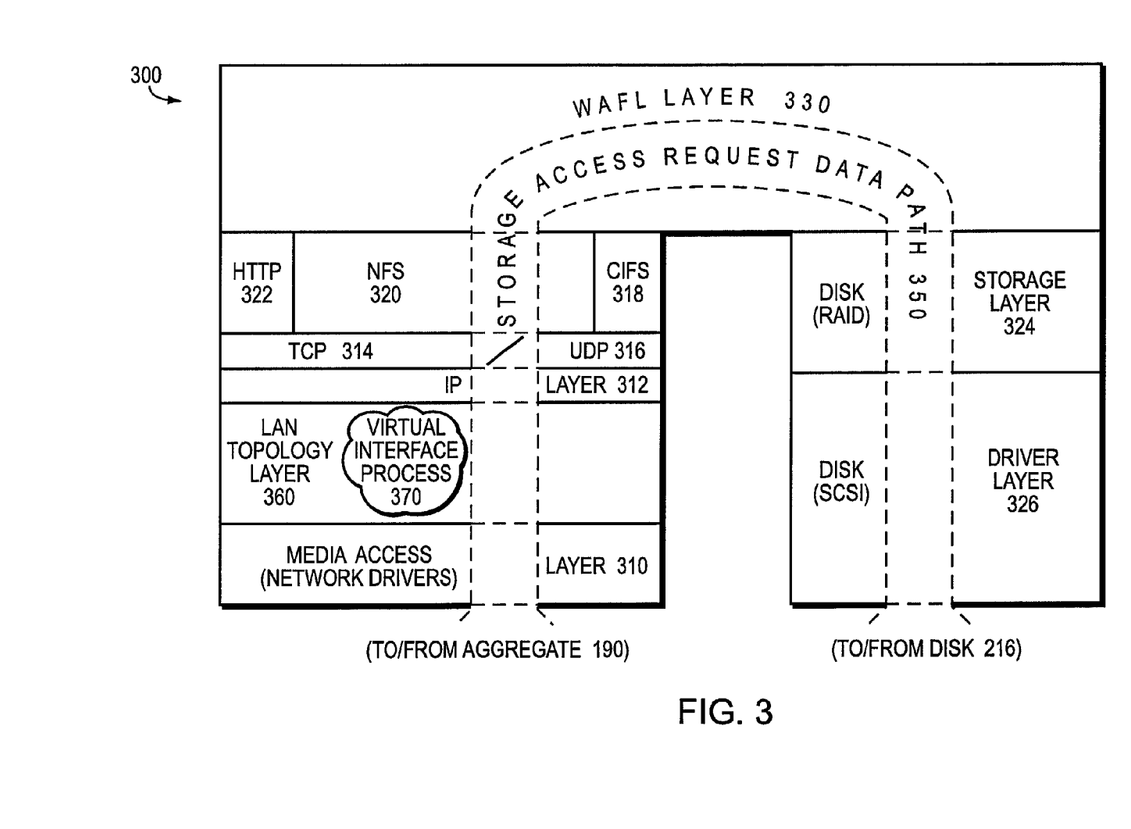
FIG. 3 is a schematic block diagram of an operating system that may be advantageously used with the present invention.

FIG. 3 is a schematic block diagram of the Data ONTAP operating system 300 that may be advantageously used with the present invention. The operating system comprises a series of software layers, including a media access layer 310 of network drivers (e.g., an Ethernet NIC driver). The operating system further includes network protocol layers, such as the IP layer 312 and its supporting transport mechanisms, the Transport Control Protocol (TCP) layer 314 and the User Datagram Protocol (UDP) layer 316. A file system protocol layer includes support for the Common Interface File System (CIFS) protocol 318, the NSF protocol 320 and the Hypertext Transfer Protocol (HTTP) protocol 322. In addition, the operating system 300 includes a disk storage layer 324 that implements a disk storage protocol, such as a Redundant Array of Independent Disks (RAID) protocol, and a disk driver layer 326 that implements a disk access protocol such as, e.g., a Small Computer Systems Interface (SCSI) protocol. Bridging the disk software layers with the network and file system protocol layers is a WAFL file system layer 330 of the operating system.

Operationally, a request from the client 110 is forwarded as, e.g., a conventional NFS protocol packet 120 over the computer network 100 and onto the switch 150, which passes the packet over a physical link 180 of the aggregate 190 to the network adapter of the filer 200. A network driver of the media access layer 310 cooperates with the network adapter 208 to load the request packet into a data buffer 222 and marks the buffer with the name of the physical interface 218 over which the incoming request was received at the filer. Each buffer 222 includes a header 224 and a data portion 226, with the incoming packet being loaded into the data portion. The contents of the header are maintained by the filer and include (i) the type of buffer, (ii) various flags and (iii) the incoming interface marked by the filer. After being loaded with the incoming packet, the buffer 222 is essentially "pushed up" the network protocol stack and delivered to an appropriate application which services the requests by, e.g. fetching data stored on disks of the filer.

Specifically, the network driver 310 passes the buffer to the network protocol layers 312-314 and onto the NFS layer 320 for additional processing prior to forwarding to the WAFL layer 330. The WAFL layer then cooperates with the disk storage (RAID) layer 324 and an appropriate driver (e.g., SCSI) of the disk driver layer 326 to access the requested data from disk 216 and load it into memory 204 for processing by the filer. Upon servicing the request, the NFS layer 320 allocates another (response) buffer 222 from the buffer pool 220 for the fetched data and further associates that response to the initial request. That is, the NFS layer 320 marks the response buffer with the physical interface associated with the incoming request.

As noted, the filer 200 is configured to provide file service to a plurality of clients 110 and, as a result, generally returns data responsive to requests issued by the clients. In order to enhance its responsiveness, the filer implements a "fast path" technique that essentially returns a response over the same physical interface 218 that was used to receive a request from the client. To invoke the fast path technique, the NFS layer 320 asserts a fast path flag within the buffer header 224 and then passes the buffer "down" the protocol stack to the IP layer 312, which examines the state of that flag. Assertion of the fast path flag informs the IP layer that it does not have to perform route calculation for this particular response. Accordingly, the interface within the filer targeted to receive the response buffer is the incoming interface 218 over which the request was received. The buffer is forwarded to that interface and the requested data is then returned to the client 110 over the network 100.

It should be noted that the software "path" through the operating system layers described above needed to perform data storage access for the client request received at the filer may alternatively be implemented in hardware. That is, in an alternate embodiment of the invention, the storage access request data path 350 may be implemented as logic circuitry embodied within a field programmable gate array (FPGA) or an application specific integrated circuit (ASIC). This type of hardware implementation increases the performance of the file service provided by filer 200 in response to a file system request packet 120 issued by client 110. Moreover, in another alternate embodiment of the invention, the processing elements of storage and network adapters 206, 208 may be configured to offload some or all of the storage access and packet processing operations, respectively, from processor 202 to thereby increase the performance of the file service provided by the filer.

The fast path technique described above may rely upon the load balancing policy over the aggregate 190 that is implemented by the switch 150; however, that load balancing policy may not be optimal. In addition, the filer 200 may be initiating a large data transfer over the computer network that does not require use of the fast path process. For example, the filer may be initiating a backup operation that is not responsive to a client request. In this case, the filer may implement its own load balancing technique to increase the bandwidth efficiency of the underlying links of the aggregate.

Figure 4:
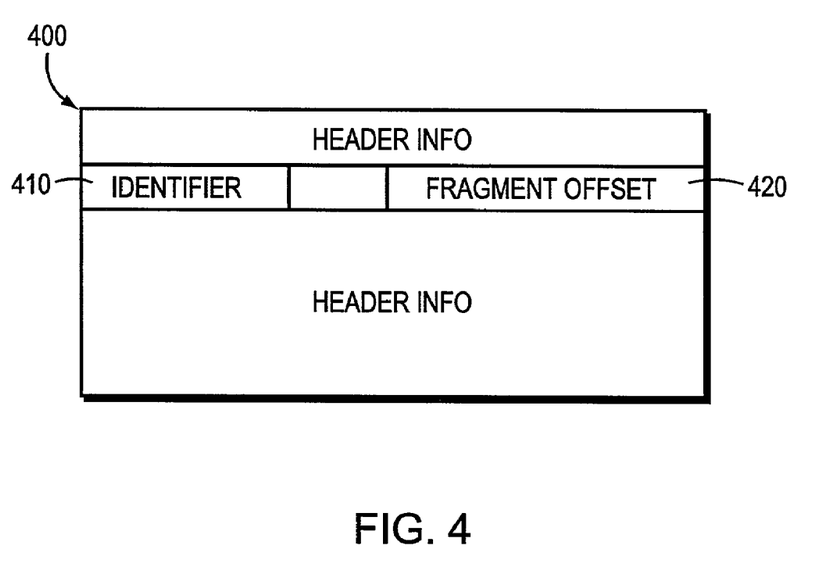
FIG. 4 is a schematic block diagram illustrating the format of an Internet Protocol (IP) header including an IP identifier that may be advantageously used with the present invention.

The present invention comprises a modified round-robin load balancing technique that uniformly distributes fragments/packets transmitted by the filer over the underlying links of the aggregate. The inventive technique defines a unit of data as a datagram, rather than an IP fragment or packet. The modified load balancing technique implements a round robin scheduling policy among the links based on an identifier associated with each datagram. FIG. 4 is a schematic block diagram illustrating the format of an IP header 400 including an IP identifier (ID) 410 that may be advantageously used with the present invention. The IP protocol, including the format and contents of an IP header, is well known and described in *Network Protocols, Signature Edition*, by Matthew G. Naugle, McGraw-Hill, 1999, pgs. 367-430.

According to the invention, the novel technique ensures that all fragments of a datagram are forwarded over the same physical link of the aggregate on the basis of a similar IP ID. That is, the modified round-robin load balancing policy is based on the IP ID 410 associated with each fragment/packet 120, rather than a fragment/packet count as would be applied by a pure round-robin policy. The inventive technique advantageously mitigates or reduces the possibility of out-of-order delivery (with TCP) and number of possible retransmissions (with UDP) of fragments/packets transmitted by the filer over the physical links of the aggregate.

Figure 5:
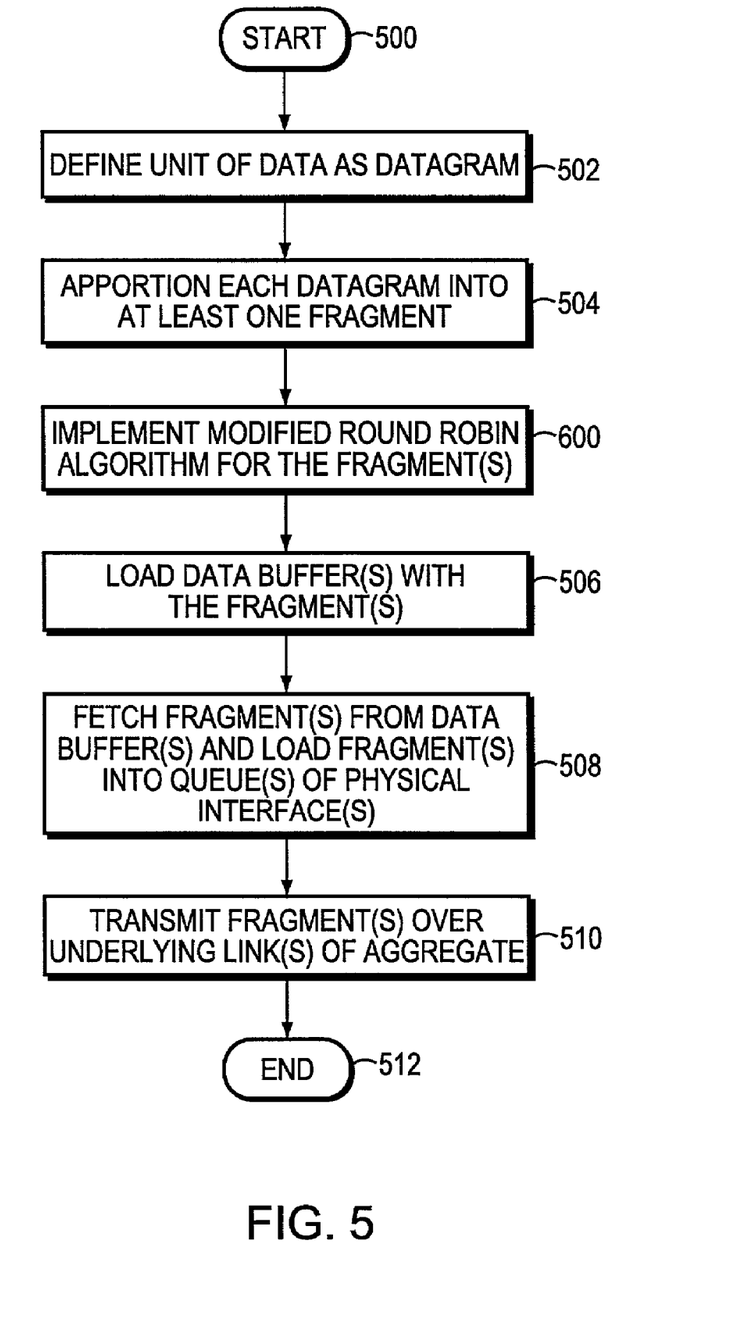
FIG. 5 is a flowchart illustrating the sequence of steps comprising a modified load balancing technique in accordance with the present invention.

FIG. 5 is a flowchart illustrating the sequence of steps comprising the modified load balancing technique in accordance with the present invention. The sequence starts at Step 500 and proceeds to Step 502 where the novel load balancing technique defines a unit of data as a datagram. In Step 504, the IP layer 312 apportions each datagram into at least one fragment depending upon, among other things, the network medium. In other words, if an application (such as NFS 320) utilizes the UDP protocol over an Ethernet medium, the IP layer creates 23 fragments from each datagram provided by the UDP layer 316. Each fragment of a UDP datagram has a similar IP ID, but has a different fragment offset number 420. In contrast, if the TCP protocol is used, the IP layer typically creates one fragment from each datagram provided by the TCP layer 314. Each fragment is transmitted over the medium as a single packet.

Figure 6:
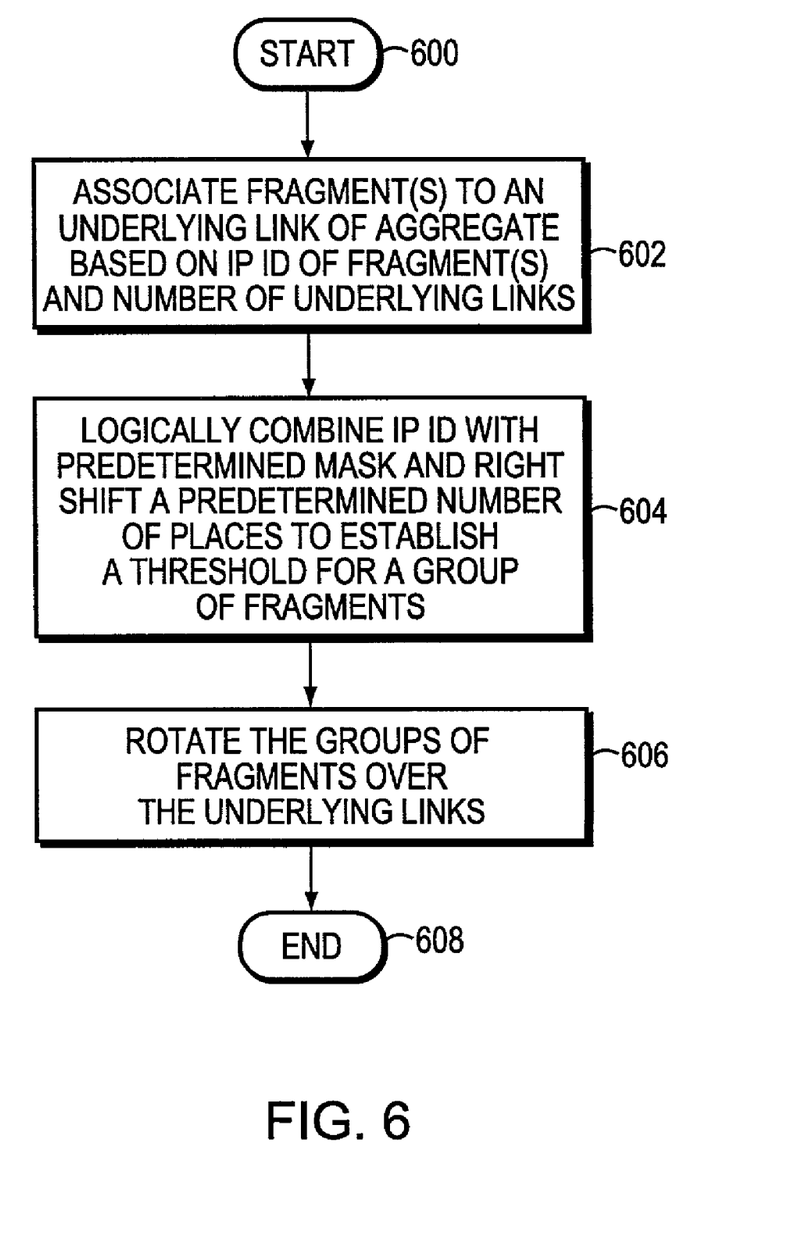
FIG. 6 is a flowchart illustrating the sequence of steps comprising a modified round robin algorithm of the present invention.

In Step 600, the fragment(s) are passed to a virtual interface process 370 for implementation of a modified round robin algorithm in accordance with the load balancing technique. The virtual interface process 370 preferably executes within a local area network (LAN) topology layer 360 of the operating system 300. Upon completion of the algorithm, the virtual interface process loads various data buffers 222 in memory 204 that are marked with the physical interface 218 with the data fragments (Step 506). The virtual interface process then transfers control to the NIC driver 310. In Step 508, the driver 310 fetches the data fragments from the data buffers 222 over the system bus 210 and loads those fragments into queues 228 of the physical interfaces 218. The fragments are then transmitted over the links of the aggregate in Step 510 and the sequence ends in Step 512. Execution of the modified load balancing technique results in, over a relatively small period of time, a generally uniform distribution of packets/fragments among the underlying links 180 of the aggregate 190.

Specifically, there is some finite delay between loading of data into the buffers 222 by the virtual interface process 370 and loading of the data into the physical interface queues 228 by the driver. If there are multiple NICs 208 competing for access to the system bus 210, there is further delay associated with each driver 310 fetching the data from the buffers 222 and loading that data into the queues 228 on the NIC. This internal delay ensures, over a period of time, that there is an even distribution of packets/fragments among all of the physical interfaces 218 of the filer 200 despite ensuring that all packets/fragments associated with a particular IP ID are sent to the same physical interface.

FIG. 6 is a flowchart illustrating the sequence of steps comprising the modified round robin algorithm of the present invention. The sequence starts in Step 600 and proceeds to Step 602 wherein the virtual interface process 370 associates fragments/packets to an underlying physical link of the aggregate on the basis of the IP ID of every fragment and the number of links in the aggregate. In the illustrative embodiment, the virtual interface process 370 has a transmit routine to send data over the underlying physical links 180. Those underlying interfaces that are "active" are stored in a data structure, e.g., a linked list. The "no_links" represents the number of active links 180 for the aggregate 190, whereas the "IP_ID" represents the IP ID 410 of the fragment/packet. When a fragment arrives for transmission at the virtual interface process 370, the link 180 over which the fragment is transmitted is generally calculated as:

$$IP\_ID \ \% \ no\_links$$

The "%" is a modulus operator used to produce a result representing the remainder upon dividing the IP_ID by the no_links. The IP ID of each datagram is a 16-bit value that is preferably calculated in a sequential manner. In Step 604, the modified round robin algorithm may be extended to logically combine ("ANDed" herein represented as "&") the IP ID with a predetermined mask, e.g., 0xFF80, to generally establish a threshold at which a group of data fragments is provided to each physical link of the aggregate. Here, when a fragment arrives for transmission at the virtual interface process 370, the link 180 over which the fragment is transmitted is generally calculated as:

$$((IP\_ID \ \& \ 0xFF80)>>7) \ \% \ no\_links$$

Accordingly, in Step 606, the effect of the algorithm is to rotate groups of fragments/packets over all the underlying links 180. In essence, the novel round robin, load balancing technique ensures that all fragments/packets having the same IP ID are sent to the same physical link 180 of the aggregate 190. The sequence then ends in Step 608.

It should be noted that the right shift (>>7) applied to the quantity (IP_ID & 0xFF80) essentially establishes a predetermined group of 128 IP IDs that is sent to a particular link, with a subsequent group of 128 IP IDs being sent to a next link of the aggregate. That is, the mask FF80 "masks off" the upper 8 bits of the 16-bit IP ID value and the right shift "shifts" the result to thereby define each 128-member group. The group of 128 IP IDs may comprise 128 different TCP packets/fragments or 128 different UDP datagrams, wherein each datagram may comprise from one to as many as 23 fragments. Since all fragments of a particular datagram have the same IP ID and since the IP ID is sequentially rotated (incremented) for each generation of a UDP or TCP datagram, a round robin like load balancing policy is realized by the novel algorithm.

The novel load balancing technique operates independent of the transport mechanism, e.g., UDP or TCP, employed by the IP protocol. For applications utilizing the UDP transport protocol, all 23 fragments of the IP datagram are sent over the same link on the basis of the IP ID. This feature of the invention increases the likelihood of retransmitting only a single datagram (including its fragments) in the presence of a glitch associated with that link, as opposed to retransmitting 2 or more datagrams because of the glitch. In other words, the novel technique reduces the number of possible retransmissions that may arise as a result of "dropping" of fragments/packets due to glitches associated with the computer network. More than 20 fragments/packets may be dropped before a retransmission of more than one datagram is necessary when implementing the inventive technique.

By establishing a predetermined group of IP IDs per link, the present invention also mitigates the possibility of out-of-order delivery of fragments/packets for applications utilizing the TCP protocol. That is, a group of sequential packets are forwarded to a particular link to thereby reduce the possibility of out-of-order delivery of the TCP packets/fragments to a client over the computer network. The inventive load balancing technique provides a uniform distribution of fragments/packets over all of the underlying links of the aggregate over a period of time, such as 3-10 seconds. Moreover, the novel technique minimizes reordering of fragments belonging to the same UDP/TCP datagram that are received by, e.g., a client.

While there has been shown and described an illustrative load balancing embodiment for uniformly distributing data transmitted by a server over a plurality of underlying physical links of an aggregate, it is to be understood that various other adaptations and modifications may be made within the spirit and scope of the invention. For example, the predetermined threshold value established by the illustrative round robin algorithm may be user-selectable. Accordingly, the group of data fragments/packets provided to each link may vary and is not necessarily fixed at 128. In particular, based on feedback from clients as to the error rate in transmission realized by those clients and based on the network traffic load, the values of the mask and shift operator may be altered to thereby establish, e.g., a 64-member group (mask=FFC0, shift=>>6) or a 256-member group (mask=FF00, shift=>>8).

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for uniformly distributing data transmitted by a server over a plurality of underlying links of an aggregate within a computer network, comprising:
   defining a unit of data as a datagram;
   apportioning each datagram into at least one fragment at the server;
   associating each fragment to an underlying link of the aggregate on the basis of an Internet protocol (IP) identifier (ID) of each datagram and a number of active links of the aggregate, wherein the step of associating includes:
   logically combining the IP ID with a predetermined mask to produce a quantity,
   right shifting the quantity a predetermined number of places,
   establishing a threshold at which a group of data is forwarded to each underlying link of the aggregate,
   producing a result representing a remainder upon dividing the right shifted logically combined quantity IP ID and predetermined mask by the number of active links, wherein the IP ID is a 16-bit value, the predetermined mask is 0xFF80 and predetermined number of right shifted places is 7, and wherein the group of data comprises 128 IP IDs;
   transmitting the fragment over its associated underlying link from the server to the computer network.

2. The method of claim 1 wherein the step of associating further comprises producing a result representing a remainder upon dividing the IP ID by the number of active links.

3. The method of claim 1 wherein the group of data comprises one of 128 different transport control protocol (TCP) fragments and 128 different user datagram protocol (UDP) datagrams.

4. The method of claim 3 wherein each UDP datagram comprises up to 23 fragments.

5. The method of claim 1 further comprising:
   loading at least one data buffer of the server with the at least one fragment;
   fetching the fragment from the data buffer; and
   loading at least one queue of the server with the fragment, the queue associated with the underlying link.

6. The method of claim 1 wherein the step of associating further comprises apportioning data equally over the plurality of underlying links of the aggregate within the computer network.

7. A computer readable medium, comprising:
   the medium storing executable program instructions for uniformly distributing data transmitted by a server over a plurality of underlying links of an aggregate within a computer network, the executable program instructions having program instructions for:
   defining a unit of data as a datagram;
   apportioning each datagram into at least one fragment at the server;
   associating each fragment to an underlying link of the aggregate on the basis of an Internet protocol (IP) identifier (ID) of each datagram and a number of active links of the aggregate, wherein the step of associating includes:
   logically combining the IP ID with a predetermined mask to produce a quantity,
   right shifting the quantity a predetermined number of places,
   establishing a threshold at which a group of data is forwarded to each underlying link of the aggregate, producing a result representing a remainder upon dividing the right shifted logically combined quantity IP ID and predetermined mask by the number of active links, wherein the IP ID is a 16-bit value, the predetermined mask is 0xFF80 and predetermined number of right shifted places is 7, and wherein the group of data comprises 128 IP IDs;

transmitting the fragment over its associated underlying link from the server to the computer network.

8. The computer readable medium of claim 7 wherein the program instruction for associating comprises a program instruction for producing a result representing a remainder upon dividing the IP ID by the number of active links.

9. The computer readable medium of claim 8 wherein the program instruction for associating further comprises program instructions for:

calculating the IP ID of each datagram in a sequential manner; and rotating the fragments of each datagram among all the underlying links to thereby ensure that all fragments having the same IP ID are provided to the same physical link of the aggregate.

10. The computer readable medium of claim 7 wherein the program instruction for associating further comprises program instructions for:

logically combining the IP ID with a predetermined mask to produce a quantity;

right shifting the quantity a predetermined number of places; and establishing a threshold at which a group of data is forwarded to each underlying link of the aggregate.

11. The computer readable medium of claim 10 wherein the program instruction for associating further comprises the program instruction for producing a result representing a remainder upon dividing the right shifted logically combined quantity IP ID and predetermined mask by the number of active links.

12. A method for uniformly distributing data transmitted by a server over a number of underlying links of an aggregate within a computer network, comprising:

providing the plurality of links as a connection to a network node;

selecting one link of the plurality of links for transmitting a datagram to the network node (hereinafter the selected link) using a round robin selection technique, the data identified by an Internet protocol (IP) identifier (ID), the IP ID indicating an end point destination for the data;

apportioning the datagram into at least one fragment;

performing a logical AND operation to combine the IP ID and a predetermined mask, wherein the predetermined mask is 0xFF80;

dividing the result of the logical AND operation by the number of underlying links to generate a remainder;

using the remainder as the link identifier;

associating the fragments with the selected link; and transmitting the fragments over the selected link.

13. A method for uniformly distributing data transmitted by a server over a number of underlying links of an aggregate within a computer network, comprising:

providing the plurality of links as a connection to a network node;

selecting one link of the plurality of links for transmitting a datagram to the network node (hereinafter the selected link) using a round robin selection technique, the data identified by an Internet protocol (IP) identifier (ID), the IP ID indicating an end point destination for the data;

apportioning the datagram into at least one fragment;

performing a logical AND operation to combine the IP ID and a predetermined mask, wherein the predetermined mask is 0xFF80 and the predetermined number of bits is 7 bits;

right shifting the result of the logical AND by a predetermined number of bits;

dividing the result of right shifting by the number of underlying links to generate a remainder;

using the remainder as the link identifier; associating the fragments with the selected link; and transmitting the fragments over the selected link.

* * * * *